United States Patent [19]

Greff, Sr.

[11] Patent Number: 4,613,145
[45] Date of Patent: Sep. 23, 1986

[54] DUAL WHEEL CLEANER

[76] Inventor: Frank Greff, Sr., Rte. 1, Box 123, Berlin, Wis. 54923

[21] Appl. No.: 696,252

[22] Filed: Jan. 29, 1985

[51] Int. Cl.[4] ............................................. B60S 1/68
[52] U.S. Cl. ............................................. 280/158 A
[58] Field of Search ............ 280/158 A; 152/DIG. 1, 152/220; 301/36 WP, 40 S, 47

[56] References Cited

U.S. PATENT DOCUMENTS

| 645,699 | 3/1900 | Ancelle | 152/14 |
| 816,189 | 3/1906 | Schleicher | 152/39 |
| 1,245,184 | 11/1917 | Bropson | 152/14 |
| 2,242,608 | 5/1941 | Graves | 280/158 A |
| 2,356,292 | 8/1944 | Wildman | 280/158 A |
| 2,397,741 | 5/1946 | Jordan, Jr. | 301/36 R |
| 3,913,943 | 10/1975 | Tamburino et al. | 280/158 A |

Primary Examiner—John J. Love
Assistant Examiner—Richard M. Camby
Attorney, Agent, or Firm—Andrus, Sceales, Starke & Sawall

[57] ABSTRACT

In a device having dual wheels (6, 8) for rolling along the ground and subject to clogging of material such as mud and the like therebetween, a dual wheel cleaner (10) is provided by a third wheel or annular member (12) suspended between the dual wheels and radially movable relative thereto such that material creeping up between the dual wheels at the bottom pushes the central suspended wheel upwardly such that as the dual wheels rotate, material is discharged by the suspended wheel radially outwardly from between the top periphery of the dual wheels.

9 Claims, 6 Drawing Figures

DUAL WHEEL CLEANER

BACKGROUND AND SUMMARY

The invention provides a dual wheel cleaner for tractors, combines, trucks, discs and so on, having dual wheels and/or discs for rolling along the ground and subject to clogging of material such as mud and the like between the wheels or discs. As used herein the term wheel includes equivalents such as discs and the like.

The present invention provides simple and effective means between the wheels for cleaning same. A third wheel or annular member having an outer diameter slightly less than the outer diameter of the dual wheels is suspended therebetween and radially movable relative thereto such that materials between the dual wheels at the bottom pushes the third wheel upwardly such that as the dual wheels rotate, material is discharged by the third wheel radially outwardly from between the top periphery of the dual wheels.

DESCRIPTION OF THE INVENTION

Figure 1:
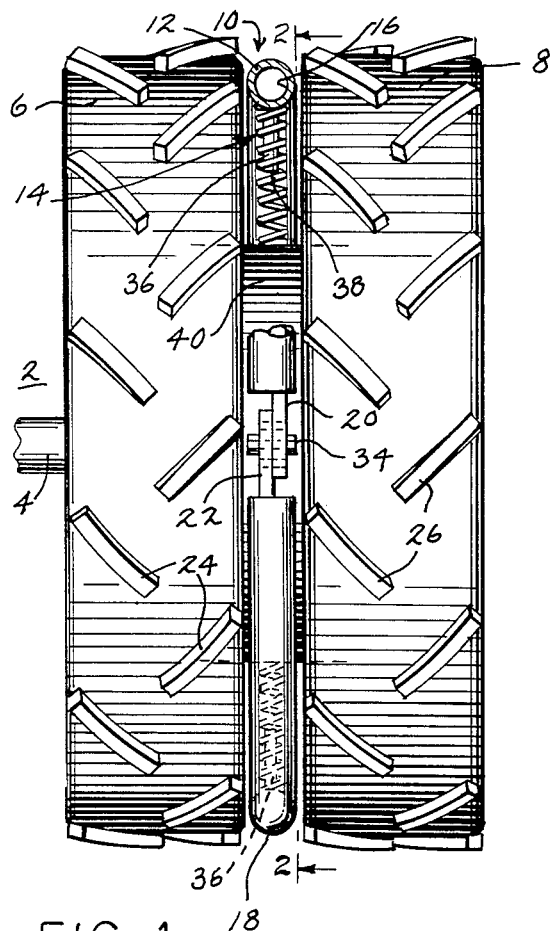
FIG. 1 is an end view of a dual wheel cleaner in accordance with the invention, in its environment of use.

FIG. 1 shows a portion of a device 2 having an axle 4 mounting dual wheels 6 and 8 for rolling along the ground and subject to clogging of material such as mud, debris and the like between the wheels. Nonlimiting examples of such devices are tractors, combines, discs, trucks, trailers, and so on.

Figure 3:
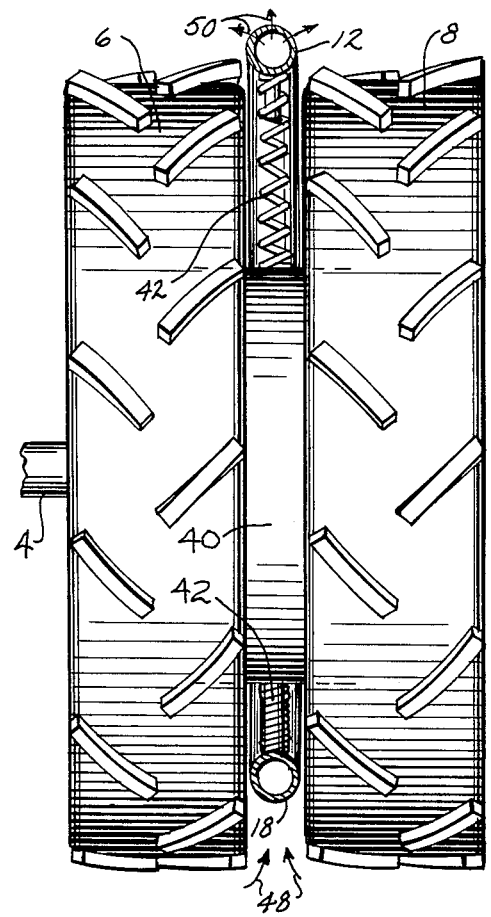
FIG. 3 is an end view like FIG. 1 but showing a discharge position of the dual wheel cleaner.
Figure 2:
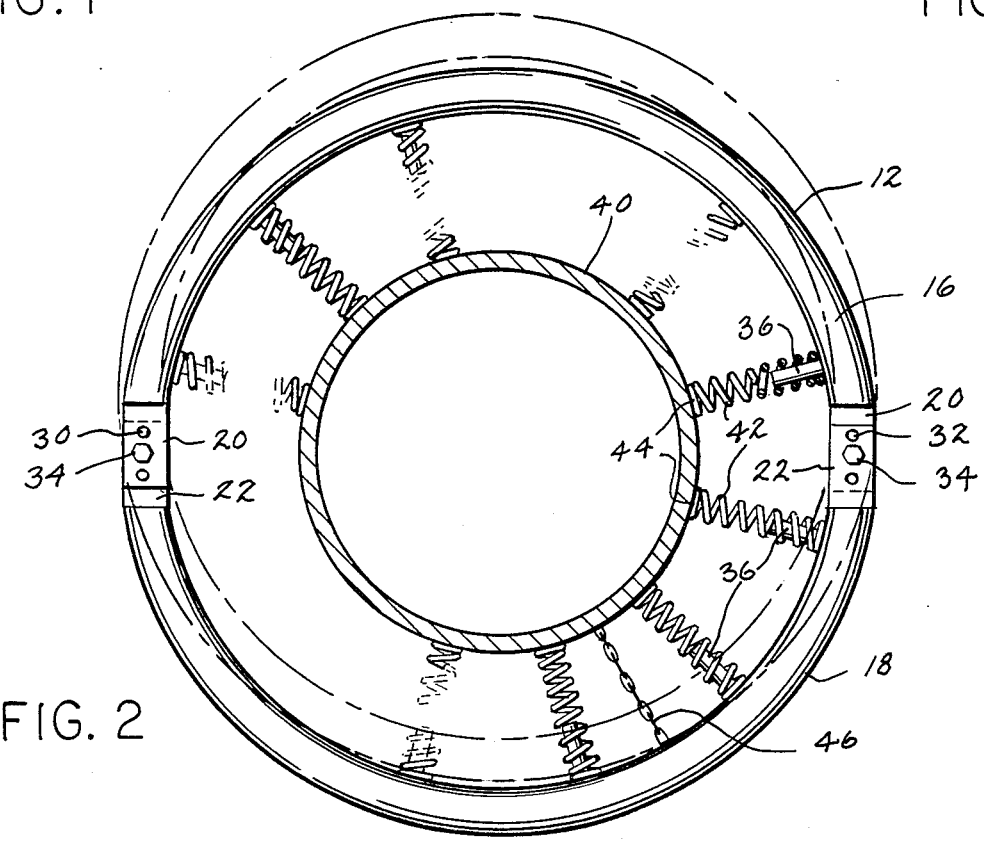
FIG. 2 is a sectional view taken along line 2—2 of FIG. 1.

The invention provides a dual wheel cleaner 10 comprising a third wheel or annular member 12 having an outer diameter slightly less than the outer diameter of dual wheels 6 and 8, and means 14 suspending third wheel or annular member 12 between the dual wheels for radial movement relative thereto, as shown in FIG. 3 and by dashed line in FIG. 2. Material or debris creeping up between dual wheels 6 and 8 at the bottom pushes third wheel 12 upwardly such that as the dual wheels rotate, material is discharged by third wheel 12 radially outwardly from between the top periphery of the dual wheels, FIG. 3.

Figure 4:
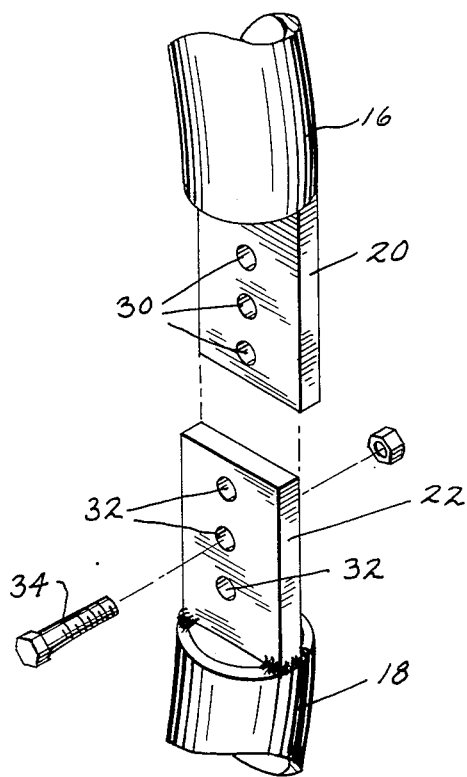
FIG. 4 is an isolated perspective view of a portion of FIG. 2.

Third wheel or annular member 12 is a multisection unit, for example formed by a pair of semicircular outer pipes 16 and 18 or the like, FIG. 2, which may be of various materials such as metal or plastic. Sections 16 and 18 are joined by adjustable attachment means such as hinge bolts or brackets 20 and 22, FIG. 4, for changing the diameter of the assembled member 12 to allow for wear of dual wheels 6 and 8 to a smaller diameter, e.g., as treads 24 and 26 wear down. The brackets may be provided by a pair of tabs as shown at 20 and 22 welded on the ends of pipes 16 and 18 or inserted and welded therein, and having plural holes such as 28 and 30 therethrough for receiving a bolt 34 through selectively aligned holes in the overlapped tabs for adjusting the diameter of assembled wheel 12. Other adjustable attachment means for sections 16 and 18 are of course feasible, such as a telescopic type arrangement.

Each of the plurality of sections forming third wheel or annular member 12 has a plurality of partially radially inwardly extending studs 36 having inner ends 38 radially spaced from central hub 40 upon which dual wheels 6 and 8 are mounted. Central hub 40 is already part of the tractor or the like, and not part of the add-on dual wheel cleaner of the invention. A plurality of coil springs 42 are mounted and retained on respective studs 38. The inner ends 44 of compression springs 42 bear against hub 40 such that third wheel 12 is resiliently radially supported on hub 40. A chain 46 may be mounted between hub 40 and wheel 12 to limit the radial outward movement of the latter. If the rolling movement is leftward in FIG. 2, it may be desirable to mount chain 46 slightly rearward of bottom center as shown, because mud or the like will tend to push wheel 12 rearwardly and upwardly.

FIG. 3 shows central third wheel 12 in its discharge position. As must or the like creeps up between wheels 6 and 8 at the bottom, as shown at 48, such material pushes suspended wheel 12 upwardly which in turn pushes material radially outwardly from between the top of the dual wheels as shown at 50. The coil springs in the bottom section 18 of wheel 12 compress, and the coil springs in the upper section 16 of wheel 12 expand. The solid line position shown in FIG. 2 is that of FIG. 1, which is the normal relaxed condition of wheel 12, without material between dual wheels 6 and 8. The dashed line position of FIG. 2 is that of FIG. 3 showing suspended wheel 12 extending beyond the outer periphery of dual wheels 6 and 8 to discharge material.

Figure 6:
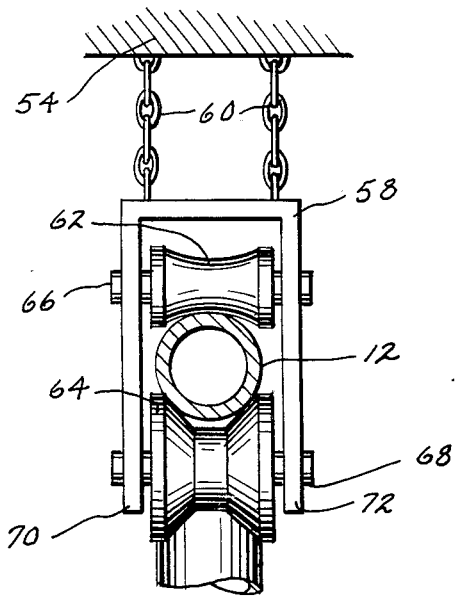
FIG. 6 is a sectional view taken along line 6—6 of FIG. 5.
Figure 5:
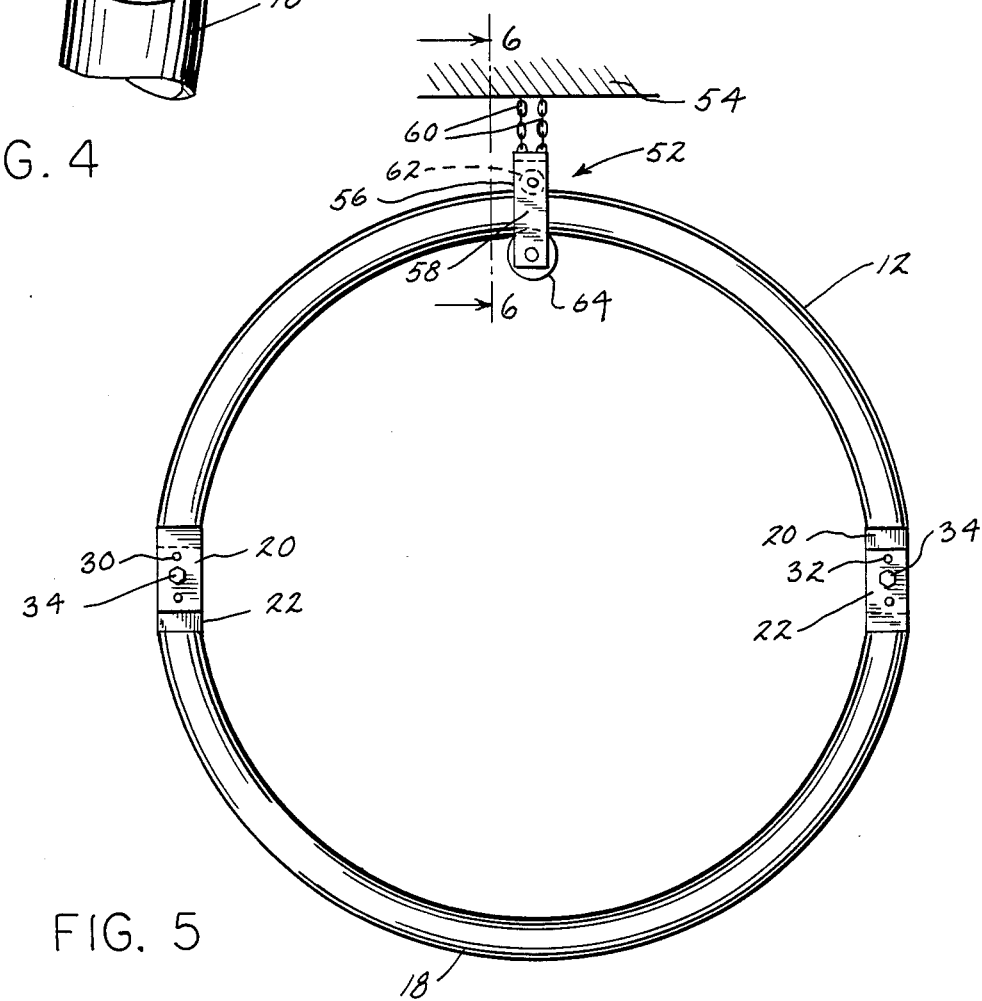
FIG. 5 is a side view of an alternate embodiment of a dual wheel cleaner in accordance with the invention.

FIG. 5 shows an alternate embodiment, and like reference numerals are used where appropriate to facilitate clarity. Means 52 is provided for mounting the third wheel or annular member 12 to a frame portion 54 of the tractor or the like which is above dual wheels 6 and 8, to suspend wheel 12 between the dual wheels and allow upward movement of third wheel 12. Mounting means 52 comprises flexible hanger means 56 suspending wheel 12 by gravity. The hanger includes an inverted U-shaped yoke 58, FIG. 6, hung from frame portion 54 by chains 60 and having upper and lower rollers 62 and 64 on respective spindles 66 and 68 between the arms 70 and 72 of yoke 58. The top of third wheel or annular member 12 is retained between rollers 62 and 64 and hangs on lower roller 64. Annular member 12 pushes upwardly on upper roller 62 when annular member 12 is pushed upwardly by material between the bottom of the dual wheels 6 and 8. This upward movement of annular member 12 in turn pushes yoke 58 upwardly radially away from the dual wheels, relaxing chains 60. Suspended third wheel 12 is then in its discharge position, for example as shown in FIG. 3 and at dashed line in FIG. 2.

It is recognized that various alternatives and modifications are possible within the scope of the appended claims.

I claim:

1. In a device having dual wheels for rolling along the ground and subject to clogging of material such as mud and the like between the wheels, a dual wheel cleaner comprising a third wheel between said dual wheels and radially movable relative thereto such that material creeping up between said dual wheels at the bottom pushes said third wheel upwardly such that as said dual wheels rotate, material is discharged by said third wheel radially outwardly from between the top periphery of said dual wheels, wherein said dual wheels are mounted on a central hub and wherein said third wheel is resiliently radially supported on said hub, wherein said third wheel has a plurality of partially radially inwardly extending studs having inner ends radially spaced from said hub, and a plurality of coil springs mounted and retained on said studs, the inner ends of said springs bearing against said hub.

2. In a device having dual wheels for rolling along the ground and subject to clogging of material such as mud and the like between the wheels, a dual wheel cleaner comprising a third wheel between said dual wheels and radially movable relative thereto such that material creeping up between said dual wheels at the bottom pushes said third wheel upwardly such that as said dual wheels rotate, material is discharged by said third wheel radially outwardly from between the top periphery of said dual wheels, wherein said device has a frame portion above said dual wheels, and comprising means mounting said third wheel to said frame portion to suspend said third wheel between said dual wheels and allowing upward movement of said third wheel.

3. The invention according to claim 2 wherein said last mentioned mounting means comprises flexible hanger means suspending said third wheel by gravity.

4. In a device having dual wheels for rolling along the ground and subject to clogging of material such as mud and the like between the wheels, a dual wheel cleaner comprising a third wheel between said dual wheels and radially movable relative thereto such that material creeping up between said dual wheels at the bottom pushes said third wheel upwardly such that as said dual wheels rotate, material is discharged by said third wheel radially outwardly from between the top periphery of said dual wheels, wherein said third wheel comprises a plurality of sections joined by adjustable attachment means for changing the diameter of the assembled wheel to allow for wear of said dual wheels to a smaller outer diameter.

5. In a device having dual wheels for rolling along the ground and subject to clogging of material such as mud and the like between the wheels, a dual wheel cleaner comprising an annular member and means suspending said annular member between said dual wheels for radial movement relative thereto such that material between said dual wheels at the bottom pushes said annular member upwardly which in turn pushes material radially outwardly from between said dual wheels, wherein said annular member has an outer diameter slightly less than the outer diameter of said dual wheels, and said annular member extends beyond the outer periphery of said dual wheels when discharging said material.

6. The invention according to claim 5 wherein said dual wheels are mounted on a central hub, and said suspension means comprises radially resilient means bearing between said annular member and said hub.

7. The invention according to claim 6 comprising means connected between said central hub and said annular member and limiting the radial outward movement of said annular member, and wherein said material tends to push said annular member rearwardly and upwardly, and said limiting means is disposed slightly rearward of bottom center of said dual wheels.

8. In a device having dual wheels for rolling along the ground and subject to clogging of material such as mud and the like between the wheels, a dual wheel cleaner comprising an annular member and means suspending said annular member between said dual wheels for radial movement relative thereto such that material between said dual wheels at the bottom pushes said annular member upwardly which in turn pushes material radially outwardly from between said dual wheels, wherein said device has a frame portion above said dual wheels, and said suspension means comprises hanger means connected between said frame portion and said annular member.

9. The invention according to claim 8 wherein said hanger means comprises a yoke hung from said frame portion, said yoke having upper and lower rollers, the top said annular member being retained between said rollers, said annular member hanging on said lower roller, said annular member pushing upwardly against said upper roller when said annular member is pushed upwardly by material between the bottom of said dual wheels, said upward movement of said annular member in turn pushing said yoke upwardly radially away from said dual wheels.

* * * * *